US011263065B2

(12) United States Patent
Hebbal et al.

(10) Patent No.: US 11,263,065 B2
(45) Date of Patent: Mar. 1, 2022

(54) METHOD FOR IDENTIFYING AT LEAST ONE FUNCTION OF AN OPERATING SYSTEM KERNEL

(71) Applicant: ORANGE, Issy-les-Moulineaux (FR)

(72) Inventors: Yacine Hebbal, Caen (FR); Sylvie Laniepce, Caen (FR)

(73) Assignee: ORANGE, Issy-les-Moulineaux (FR)

( * ) Notice: Subject to any disclaimer, the term of this patent is extended or adjusted under 35 U.S.C. 154(b) by 55 days.

(21) Appl. No.: 16/304,008

(22) PCT Filed: May 22, 2017

(86) PCT No.: PCT/FR2017/051255
§ 371 (c)(1),
(2) Date: Nov. 21, 2018

(87) PCT Pub. No.: WO2017/203147
PCT Pub. Date: Nov. 30, 2017

(65) Prior Publication Data
US 2019/0205190 A1 Jul. 4, 2019

(30) Foreign Application Priority Data
May 24, 2016 (FR) ...................... 1654654

(51) Int. Cl.
G06F 9/34 (2018.01)
G06F 8/75 (2018.01)
(Continued)

(52) U.S. Cl.
CPC ............... G06F 9/545 (2013.01); G06F 8/75 (2013.01); G06F 9/3013 (2013.01); G06F 9/34 (2013.01);
(Continued)

(58) Field of Classification Search
CPC .......... G06F 9/545; G06F 8/75; G06F 9/3013; G06F 9/34; G06F 9/455; G06F 9/45558; G06F 2009/45579
See application file for complete search history.

(56) References Cited

U.S. PATENT DOCUMENTS 6,289,446 B1 * 9/2001 Nilsson ................. G06F 9/4484
712/244
7,996,836 B1 * 8/2011 McCorkendale ... H04L 63/1408
718/1
(Continued)

FOREIGN PATENT DOCUMENTS

WO    2015117013 A1    8/2015

OTHER PUBLICATIONS

"Zhongshu Gu et al., Face-Change: Application-Driven Dynamic Kernel View Switching in a Virtual Machine, 2014" (Year: 2014).*
(Continued)

Primary Examiner — Chat C Do
Assistant Examiner — Noor Alkhateeb
(74) Attorney, Agent, or Firm — David D. Brush; Westman, Champlin & Koehler, P.A.

(57) ABSTRACT

A method for identifying a function of an operating system kernel of a virtual machine. The method includes: identifying an initial instruction included in the code of the operating system kernel of the virtual machine, and locating at least one following block of instructions belonging to a function of the operating system kernel of the virtual machine, the following block being situated in a memory area following the initial instruction; locating at least one preceding block of instructions belonging to a function of the operating system kernel, the proceeding block situated in a memory area preceding the initial instruction; identifying a first block and a last block of instructions of the function of the operating system kernel from among the at least one fol-
(Continued)

lowing and preceding blocks, and recording start and end function addresses in association with the function of the operating system kernel.

11 Claims, 3 Drawing Sheets

(51) Int. Cl.
  *G06F 9/455* (2018.01)
  *G06F 9/54* (2006.01)
  *G06F 9/30* (2018.01)

(52) U.S. Cl.
  CPC .......... *G06F 9/455* (2013.01); *G06F 9/45558* (2013.01); *G06F 2009/45579* (2013.01)

(56) References Cited

U.S. PATENT DOCUMENTS

| | | | | |
|---|---|---|---|---|
| 9,003,402 B1* | 4/2015 | Carbone | ............. | G06F 9/45554 718/1 |
| 2005/0028002 A1 | 2/2005 | Christodorescu et al. | | |
| 2009/0241109 A1* | 9/2009 | Vandegrift | .......... | G06F 9/45533 718/1 |
| 2014/0157407 A1* | 6/2014 | Krishnan | ................. | G06F 21/50 726/22 |
| 2015/0013008 A1* | 1/2015 | Lukacs | .................. | G06F 21/53 726/24 |
| 2015/0033227 A1* | 1/2015 | Lin | ..................... | G06F 9/45558 718/1 |
| 2015/0039891 A1* | 2/2015 | Ignatchenko | ........... | G06F 21/53 713/171 |
| 2016/0246636 A1* | 8/2016 | Tsirkin | .................... | H04L 67/34 |
| 2016/0378844 A1* | 12/2016 | Karve | ................. | G06F 16/2365 707/620 |
| 2017/0083337 A1* | 3/2017 | Burger | ................ | G06F 12/1009 |
| 2017/0249236 A1* | 8/2017 | Tsirkin | ................ | G06F 9/45558 |

OTHER PUBLICATIONS

Static Disassembly of Obfuscated Binaries, May 18, 2004 (Year: 2004).*
International Search Report dated Jul. 11, 2017 for corresponding International Application No. PCT/FR2017/051255, filed May 22, 2017.
Written Opinion of the International Searching Authority dated Jul. 11, 2017 for corresponding International Application No. PCT/FR2017/051255, filed May 22, 2017.
English Translation of the Written Opinion of the International Searching Authority dated Jul. 19, 2017 for corresponding International Application No. PCT/FR2017/051255, filed May 22, 2017.
Gu et al. "Face-Change: Application-Driven Dynamic Kernel View Switching in a Virtual Machine." 2014 44th Annual IEEE/IFIP International Conference on Dependable Systems and Networks, IEEE, pp. 491-502. Jun. 23, 2014.

* cited by examiner

METHOD FOR IDENTIFYING AT LEAST ONE FUNCTION OF AN OPERATING SYSTEM KERNEL

CROSS-REFERENCE TO RELATED APPLICATIONS

This Application is a Section 371 National Stage Application of International Application No. PCT/FR2017/051255, filed May 22, 2017, the content of which is incorporated herein by reference in its entirety, and published as WO 2017/203147 on Nov. 30, 2017, not in English.

FIELD OF THE DISCLOSURE

The present invention relates to a method for identifying the functions of an operating system kernel of a virtual machine in a virtualized computing environment.

It is applied to particular benefit in the supervision of computing systems whose architecture is based on cloud computing resources. Cloud computing is the name by which such an architecture is best known. The supervision may advantageously be applied in order to secure virtual machines of the architecture, in particular in order to detect malicious acts and react where appropriate.

BACKGROUND OF THE DISCLOSURE

A cloud computing architecture normally comprises at least one host server that has hardware resources, such as memory, a microprocessor, a network interface, etc., on which a cloud computing service provided by a service provider to one or more clients is based. The service provider thus makes available, to the client, one or more virtual machines that constitute the execution environment of the service specific to the client and that use the resources of the host server to run. A virtualization layer situated between the hardware resources of the host server and the virtual machines is designed to present one more of the operating systems of the virtual machines with a space for virtual resources, constructed from the space for the hardware resources of the host server. This layer is implemented by a virtualization module, commonly called a "hypervisor", which manages the allocation of the hardware resources between the various virtual machines, and which makes these virtualized resources available to the virtual machines. The virtual machines are for example client virtual machines that may comprise sensitive data or code to be protected and for which there is a requirement to supervise security.

In the context of cloud computing, a number of approaches have been proposed in order to analyze the behavior of virtual machines for the purpose of detecting and/or mitigating security problems. One approach, which was conceived in 2003, proposed to position itself at the level of the virtualization layer of the environment, that is to say the hypervisor, so as to supervise the use of the resources by the virtual machines and to detect possible security problems at this level. Such an approach exhibits several advantages. It positions itself outside the virtual machine, the hypervisor being completely isolated from the virtual machines; it is therefore outside of the scope of an attacker who may have taken control of one or more virtual machines. Moreover, it makes it possible to have complete visibility of the architecture, since it offers visibility of the use of the hardware resources by all of the virtual machines. Such a method is known under the name "virtual machine introspection method". However, one known difficulty with this method is that of interpreting the information observed at the level of the hypervisor. Specifically, the information able to be observed at this level is low-level information or what is called "raw data" in English, typically 0s and 1s, that it is necessary to interpret. In particular, it is necessary, from these raw data, to obtain semantics at the level of a virtual machine in order to qualify an activity on this machine, such as for example the execution of a program or of a process, the accessing of a file, the execution of a virus, etc. This difference between raw data and interpretation thereof as a clearly identified activity on a virtual machine is called a "semantic gap" in English. As soon as the semantic gap is overcome, the hypervisor becomes intelligent insofar as it is possible for it to supervise the execution of all of the virtual machines, to analyze their behavior and to act where appropriate.

Various endeavors aimed at bridging this semantic gap have been put forward.

These endeavors focus on the supervision of the functions of the operating system kernel (as it is known in English) of the virtual machines. Specifically, understanding the operation of a virtual machine means understanding the kernel functions. The kernel groups all of the vital operations of the machine: it is the part of the operating system that manages access to the resources of the machine. To supervise a virtual machine from the hypervisor, it is therefore necessary to be able to observe, intercept or even call, from the hypervisor, the functions of the operating system kernel.

To this end, a first known method proposes identifying, during the execution of a virtual machine, system calls (as they are known in English, or "syscall" for short). A system call makes it possible to communicate directly with the operating system kernel of the virtual machine. For example, to write to the hard disk, a program in the user space has to use system calls that control the write operations to the disk that are commanded from the program. System calls guarantee security of the data and integrity thereof on the disk by controlling the applications in the user space.

System calls start and terminate with identified instructions, in this case "syscall", "sysret" and "sysexit". It is therefore possible to notify the hypervisor each time the "syscall" instruction is encountered during the execution of the virtual machine, and also to control the end of a system call in the same way. Once it has been alerted, it is possible for the hypervisor to interrupt the execution of the virtual machine and to resume it. However, this method affords just a limited view of the virtual machine: system calls constitute just a tiny part of the functions of the operating system kernel. Out of roughly 26 000 functions performed by the operating system kernel, only roughly 360 correspond to system calls. Specifically, besides system calls, there are also numerous other internal kernel functions that are called by the system calls. For example, there are internal kernel functions that make it possible to act on the scheduler of an operating system, for example by deleting a process, a user, by intercepting all of the data transiting via the keyboard, etc. If these functions are subject to an attack, the consequences on the operation of the virtual machine may be catastrophic. These internal functions start with instructions that are not easily identifiable. Thus, this method allows only supervision of a limited set of functions of the operating system kernel of a virtual machine. Moreover, virtual machines necessarily have to be executing in order to detect the system calls and thus identify the kernel functions in question.

Another known technique proposes supervising the execution of kernel functions by way of configuration. All operating systems and operating system versions are specifically documented. Thus, the addresses of all of the kernel functions are accessible in technical documents. It is then possible to position control points in the code of a virtual machine so as to be notified, during the execution of the virtual machine, of the execution of a function, to trigger an action. However, each operating system, or even each operating system version, has its own documentation. It is therefore necessary to have as many configurations as there are possible operating systems. Furthermore, a cloud architecture provider may not have knowledge a priori of the operating system of the virtual machines that the architecture is hosting. This is the case for an "IaaS" (from the English "Infrastructure as a Service") architecture, in which a client configures his virtual machine as far as the operating system, which he installs himself.

There is thus no satisfactory method for supervising all of the functions of the operating system kernel of a virtual machine that is not linked to a particular operating system.

SUMMARY

One of the aims of the invention is to remedy inadequacies/drawbacks of the prior art and/or to make improvements thereto.

To this end, the invention proposes a method for identifying at least one function of an operating system kernel of a virtual machine, said virtual machine comprising an operating system communicating with a hypervisor of a host system, said hypervisor interfacing between the operating system and hardware resources of the host system, said method comprising the following steps:

identifying an initial instruction contained in the code of the operating system kernel of the virtual machine, locating at least one following block of instructions belonging to at least one function of the operating system kernel of the virtual machine, said following block being situated in a memory area that follows the initial instruction, locating at least one preceding block of instructions belonging to at least one function of the operating system kernel of the virtual machine, said preceding block being situated in a memory area that precedes the initial instruction, identifying a first block and a last block of instructions of the function of the operating system kernel from among the at least one following block and the at least one preceding block, and recording a function start address and a function end address in association with the function of the operating system kernel, the function start address being the address of the first instruction of the first block and the function end address being the address of the last instruction of the last block.

The method for identifying at least one function of an operating system kernel of a virtual machine provides a solution for bridging the semantic gap that exists between low-level data, visible at the level of the hypervisor and relating to the execution of a virtual machine, and an interpretation of these data in terms understandable to a human being. The method makes it possible to construct, for a virtual machine that comprises a given operating system, a table of functions that associates, with the name of the function, a first address in memory that corresponds to the input point of the function and a second address that corresponds to a last output point of the function that corresponds to the end address of the function. Such a table constitutes a high-level interface for accessing data via the hypervisor.

Such an interface affords a great number of possibilities for supervising the kernel functions: on the one hand, all of the kernel functions are able to be supervised, and not just system calls. On the other hand, it is possible to supervise the output of a function, by supervising the last output point of the function, and also possible other points of the function for which the hypervisor wishes to be notified. The other output points are then identified by scanning the instructions contained between the first instruction of the function and the last instruction. The hypervisor is thus able to access very precise knowledge of the operation of the functions.

The method introduces the concept of a block of instructions. A function is formed of blocks of instructions. A block end instruction is easy to identify, and the blocks follow on in memory. This concept of a block makes it possible to locate a function, thus defined by a start block and an end block. Moreover, it makes it possible to apply the method to operating systems for which function start instructions are not clearly identified. This is the case for example for optimized operating systems.

The method is implemented without knowledge a priori of the operating system running on the virtual machine. It is known that the kernel functions occupy a contiguous memory area. However, without knowledge of the operating system, it is impossible to define the memory area. The method therefore proposes to identify a first instruction, it being certain that it forms part of the code of the kernel, and to locate all of the blocks of instructions starting from this instruction.

The method is independent of the operating systems of the virtual machines whose activity it is desired to analyze. In this sense, it is said to be "OS agnostic". Specifically, the steps of the method are identical, regardless of the operating system. Moreover, the method makes it possible to be exhaustive with regard to the kernel functions that are analyzed, insofar as it proposes a map of the entire memory area allocated to the kernel and identifies the start and end addresses of all of the kernel functions, which contains the system calls and the functions internal to the kernel.

The method may be termed secure on account of its independence with respect to the virtual machines that it analyzes. Specifically, the method is implemented at the level of the hypervisor. This independence does not allow an attacker, who may have taken control of a virtual machine, to disrupt the execution of the method.

In one exemplary embodiment, the initial instruction is identified by accessing a specific register of the processor.

Processors reference specific registers. Such registers are necessarily in the area of the operating system kernel. For example, in the case of the x86 processor, the "IA32_SYSENTER_EIP" register points to the first instruction of the system calls manager. This register is selected to be an initial instruction by the method.

In one exemplary embodiment, locating at least one following block, situated in the memory area that follows the initial instruction, comprises:

searching, in the memory area that follows the initial instruction, for a current instruction that follows a block end instruction, said current instruction being the first instruction of the following block, searching, in the memory area that follows the first instruction of the following block, for a following block end instruction, said following block end instruction being the last instruction of the following block.

The blocks of instructions located in memory after the initial instruction are identified as the method progresses, as far as the end of the memory area allocated to the kernel space. Identifying the blocks of instructions consists in identifying instructions that correspond to block ends. The instruction that follows a block end is equated to a following block start instruction, except for the case where the instruction corresponds to padding bytes, in which case these bytes are ignored. Thus, the block starts are identified by their position with respect to a block end. Such an identification is suited to operating systems for which a function start, which corresponds to the first instruction of a first block, is not known.

In one exemplary embodiment, locating at least one preceding block, situated in the memory area that precedes the initial instruction, comprises:
  searching, in the memory area that precedes the initial instruction, for at least two block end instructions, a first block end instruction being situated at a first address, a second block end instruction being situated at a second address, the first address being further from the initial instruction than the second address,
  implementing disassembly on instructions that follow the first address,
  when an instruction obtained through disassembly from the first address and appearing in the second address corresponds to the second block end instruction, selecting the instruction that follows the second block end instruction, said instruction that follows the second block end instruction corresponding to the first instruction of the at least one preceding block,
  searching, in the memory area that follows the first instruction of the at least one preceding block, for a further block end instruction, said further block end instruction corresponding to the last instruction of the at least one preceding block.

Once the initial instruction has been located, it is necessary to locate all the blocks of instructions that are situated in the memory area allocated to the kernel before this instruction.

Generally speaking, it is not easy to identify the blocks that precede the initial instruction in memory. Specifically, the instructions of a processor, for example of the x86 processor, have variable sizes, from one to several bytes, and are not aligned in memory. It is therefore difficult to disassemble binary code in assembler by going through the memory, as it is never certain that a byte corresponds to an instruction start, or whether it corresponds to an instruction or to an operand. Moreover, for the x86 processor, every byte has a meaning. It is therefore possible to disassemble the second byte of an instruction that comprises several thereof and to obtain an instruction that exists in assembler language. For all that, the assembler code that is obtained does not correspond to the binary instruction that started at the preceding byte. Lastly, it is not known where to position oneself in the memory in order to disassemble the binary code, since it is not known where the code of the kernel starts. The method proposes a solution for identifying the blocks of instructions situated before the initial instruction, which cleverly uses the self-repairing disassembly mechanism. The mechanism is applied starting from a first instruction that is believed to be block end instructions. The self-repairing mechanism makes it possible to ensure that a second instruction, which is also believed to be a block end instruction, actually corresponds to such an instruction. Once the correct block end instruction has been located, the blocks that follow this block end are identified in a conventional manner. In one exemplary embodiment, safety distances are taken into account so as to have a minimum number of instructions between the first and the second block end instruction. Such a safety distance makes it possible to optimize the chances of identifying the blocks and therefore the effectiveness of the disassembly.

Advantageously, the identification of a first block and of a last block of instructions of the kernel function comprises:
  calculating, for each of the at least one following block and the at least one preceding block, a signature for the instructions of the block,
  searching for said signature in a reference base of block signatures, said reference base containing, for at least one reference operating system, the signatures for the instructions of the blocks that form part of the reference functions of said operating system kernel, a signature for the instructions of a block in the base being associated with the name of at least one reference kernel function that contains said block,
  classifying the at least one following block and the at least one preceding block using a block address, and grouping successive blocks and identifying the kernel function that contains said group of blocks, a first block of the group corresponding to the first block of the kernel function and a last block of the group corresponding to the last block of the kernel function.

Once the blocks of instructions have been located in the area of the kernel, these are grouped by function. A function then comprises a set of blocks that are ordered in memory. This grouping thus easily makes it possible to obtain the function start address, which corresponds to the address of the first instruction of the first block of the function. In the same way, it makes it possible to obtain the end address of the function, which corresponds to the address of the last instruction of the last block.

In one exemplary embodiment, the identification method comprises, in a phase of constructing the reference base of signatures for the blocks that form part of the reference functions of at least one reference operating system, the following steps:
  obtaining the start address of a first reference function, the start address of the first reference function being associated with the name of the first reference function in documentation of the operating system, and obtaining, from the documentation, the start address of a following reference function,
  associating a memory address preceding the start address of the following reference function with an end address of the first reference function,
  identifying, between the start address of the first reference function and the end address of the first reference function, at least one block of instructions, the last instruction of said block being a block end instruction,
  calculating a signature for said identified block of instructions,
  recording said signature for the block in the reference base in association with the name of the first reference function.

These steps correspond to populating the reference base. They are implemented in a particular execution environment insofar as the reference operating system is known, and that, for this operating system, documentation is used to initiate the steps of constructing the base. The population of the reference base therefore draws on valid elements that are provided by a publisher of the reference operating system. This guarantees the integrity and the exhaustiveness of the reference base. These two qualities therefore also guarantee the reliability of the method for identifying the functions of the operating system kernels.

The invention also relates to the use of the identification method using a module for supervising the execution of a virtual machine, said supervision module commanding the hypervisor to inject the call of a kernel function into the virtual machine.

The invention also relates to the use of the identification method using a module for supervising the execution of a virtual machine, said supervision module commanding the hypervisor to position bits associated with the executable nature of a kernel function at non-executable so as to receive a notification when said function is executed by the virtual machine.

The invention also relates to the use of the method for the identification of at least one function by a module for supervising the execution of a virtual machine, said supervision module commanding the hypervisor to inject an activity interception instruction into the code of a kernel function so as to receive a notification when said function is executed by the virtual machine.

This constitutes another exemplary use of the method for identifying functions of the kernel of a virtual machine in which code corresponding to interception instructions is injected into the code of a kernel function for which it is desired for the hypervisor to be notified when said code is executed. It has the advantage of being flexible and configurable by making it possible to select precisely the kernel functions for which it is desired for the hypervisor to be notified, and the type of notification that the hypervisor receives. In particular, it is possible to select a notification that interrupts the execution of the virtual machine, or a notification that does not interrupt it.

The invention also relates to the use of the method for the identification of at least one function by a module for supervising the execution of a virtual machine, said supervision module commanding the hypervisor to inject an activity interception instruction into the code of a kernel function so as to a receive a notification at the end of the execution of said function by the virtual machine.

In this example, it is the end of the execution of a function that is supervised so as to notify the hypervisor. Supervising the end of the execution of a function makes it possible to know the result of the function, possibly to modify it, to add a processing operation, etc. It is also possible to inject activity interception instructions at possible other output points of the function for which the hypervisor wishes to be notified. In this case, the other output points are recognized by scanning the instructions contained between the first instruction of the function and the last instruction. There are therefore a great many possibilities for supervising the functions.

The invention also relates to a device for identifying at least one function of an operating system kernel of a virtual machine, said virtual machine comprising an operating system communicating with a hypervisor of the server, said hypervisor interfacing between the operating system and hardware resources of the server, said server comprising:

means for identifying an initial instruction, designed to identify an initial instruction contained in the code of the operating system kernel of the virtual machine, first location means, designed to locate at least one following block of instructions contained in at least one function of the operating system kernel of the virtual machine, said following block being situated in a memory area that follows the initial instruction, second location means, designed to locate at least one preceding block of instructions contained in at least one function of the operating system kernel of the virtual machine, said preceding block being situated in a memory area that precedes the initial instruction, identification means, designed to identify, from among the at least one following block and the at least one preceding block, a first block and a last block of instructions that form the function of the operating system kernel, recording means, designed to record a function start address and a function end address in association with the function of the operating system kernel, the function start address being the address of the first instruction of the first block and the function end address being the address of the last instruction of the last block.

The invention also relates to a computer program on a data medium and able to be loaded in the memory of a computer, the program comprising code portions for executing the steps of the method for identifying at least one function of an operating system kernel of a virtual machine such as described above when the program is executed on said computer.

The invention lastly also relates to a data medium on which the above program is recorded.

BRIEF DESCRIPTION OF THE DRAWINGS

Other features and advantages of the present invention will be better understood from the description and the appended drawings, in which.

DETAILED DESCRIPTION OF ILLUSTRATIVE EMBODIMENTS

Figure 1:
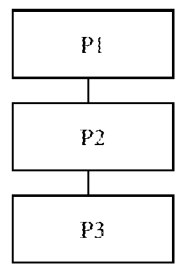
FIG. 1 is a schematic depiction of a method for identifying at least one function of an operating system kernel of a virtual machine, according to one exemplary embodiment.

The steps of a method for identifying at least one function of an operating system kernel of a virtual machine, according to one exemplary embodiment, will now be described with reference to FIGS. 1 to 4.

A host server (not shown in FIGS. 1 to 4) of a cloud computing architecture hosts one or more virtual machines that each have their own operating system. A virtualization layer of the host server is designed to present the operating systems of the virtual machines hosted by the server with a space for virtual resources, constructed from hardware resources of the host server. The virtualization layer is implemented by a module called a hypervisor that manages the allocation of the hardware resources between the various virtual machines, and that makes the virtualized resources available to them. In the exemplary embodiment described here, the hypervisor comprises a module for identifying the functions of the operating system kernel of a virtual machine. The module for identifying the kernel functions is a software module that comprises code instructions that are designed to implement the steps of a method for identifying the kernel functions. In the example described here, the processor of the host server is an x86 processor. There is no limit attached to this type of architecture.

The method for identifying at least one function of an operating system kernel of a virtual machine hosted by a host server makes it possible, on the basis of the information able to be observed from the hypervisor of the host server, to identify, that is to say to know and locate, all of the functions of the operating system kernel of the virtual machine. Knowing and locating the functions of the operating system kernel of a virtual machine from a hypervisor is a prerequisite for intercepting and commanding the execution, from the hypervisor, of the kernel functions, for the purpose of supervising the execution of this virtual machine. Such supervision makes it possible to detect and mitigate security problems, while at the same time being isolated from this machine. It is recognized that the kernel functions are vital for the operating system, and being capable of supervising all of the kernel functions of a virtual machine makes it possible to contemplate complete supervision of the security of virtual machines.

Locating the functions consists in obtaining, for all of the functions of the operating system kernel, a start address, which corresponds to the address of the first instruction of the function, and an end address, which corresponds to the address of the last instruction of the function. It is not easy to identify and to locate functions in a code. Specifically, the information for locating the functions of a kernel varies from one operating system to another and from one system version to another. Some operating systems, called non-optimized operating systems, provide specific instructions for defining the code of the kernel functions. For example, the instruction "push ebp" followed by the instruction "mov ebp, esp" declare the start of a function, and a following instruction "ret" declares the end of the function. However, for other operating systems, called optimized operating systems, for example Optimized Kernel Debian 6, the functions are not defined by such instructions. Typically, no specific instruction declares a function start. An optimized operating system takes up less memory space and runs faster.

Moreover, it is all the more difficult to obtain this information as, a priori, there is no information available with regard to the operating system running on the virtual machine that it is desired to analyze.

It should be noted that the memory space allocated to a virtual machine contains a user space and a space dedicated to the kernel. The user space contains the code of each user application and the data of each of the applications. The kernel space contains a space dedicated to the code of the kernel and a space dedicated to the data of the kernel. The code of the kernel contains a main code and extensions, which are added for example when a driver is installed, etc. The main code of the kernel contains system calls (as they are known in English, or "syscall" for short), which form the API (from the English "application programming interface") of the kernel, and which are functions that are able to be called from user programs. The code of the kernel also contains functions internal to the kernel. The internal functions are not able to be accessed directly from the user programs. However, they are able to be called by the system calls. For example, if a system call makes it possible to allocate a memory area, to write a value to this area, internal functions, responsible for managing the memory, will be executed. It is known that the memory area that contains the system calls and the internal kernel functions is a contiguous area. It is this contiguous memory area that the method wishes to analyze in order to identify and locate all of the kernel functions.

Studies on various operating systems have allowed the inventors to conclude that, in all operating systems, a function was formed of a set of blocks of instructions. A block of instructions comprises a few elementary instructions and terminates with a block end instruction. The block end instructions are known and identified and depend on the processor. They are identical regardless of the operating systems running on this processor. For example, for the x86 processor, the block end instructions comprise the undefined instruction, or "ud2", the branch instructions that comprise the conditional jumps, the unconditional jumps "JMP", the function call instructions "CALL", the instructions that make it possible to exit a procedure, such as "RET", "SYSEXIT", and the instructions that make it possible to transfer control, such as "SYSENTER".

Moreover, a block end instruction is always followed by an instruction that constitutes the first instruction of a following block, or one or more padding bytes (as they are known in English). The padding instructions are added by the compiler and should be ignored. The padding instructions are moreover known and identified. They comprise the instructions NOP, LEAESI, [ESI], LEAEDI, [EDI].

It is assumed that there is a reference database, denoted BDR, which contains, for a given set of operating systems, a set of signatures for the blocks of instructions that form the functions of the operating system kernels. The reference base BDR stores a set of signatures for blocks of instructions and, with each of the block signatures, there is associated the name of one or of a plurality of kernel functions of which the block of instructions forms part. The construction of the reference base BDR is described further on with reference to FIG. 5.

FIG. 1 is a schematic depiction of the main phases of the method for identifying at least one function of an operating system kernel, according to one exemplary embodiment. Each of the phases is subsequently described in detail.

The identification method comprises, for a given virtual machine and its operating system, a first phase P1 of identifying an initial instruction and of locating the following blocks, which consists in identifying an instruction of the kernel and in locating blocks that follow this instruction. The instruction, called initial instruction, is an instruction for which it is certain that it forms part of the kernel space. From one operating system to another, or even from one system version to another, the kernel space is not situated at the same location in memory. It is therefore not known where this space starts and ends. This therefore involves finding the memory space, and identifying all of the kernel functions in this space.

Once the initial instruction has been identified, the blocks of instructions situated after the initial instruction in the memory are located. Locating a block of instructions consists in identifying the address in memory of the first instruction of the block, the address of the last instruction of the block, in calculating a signature for the instructions of the block, and in associating this signature with one or more functions in which the block of instructions appears.

In a second location phase P2, blocks of instructions situated before the initial instruction $I_0$ are located. For each block that is located, a signature for the instructions of the block is calculated and the function(s) in which the block appears is (are) identified.

In a third grouping phase P3, all of the identified blocks are grouped by function. In particular, a first block and a last block of instructions of the function of the operating system kernel are identified from among the blocks identified in preceding phases P1 and P2. Moreover, a function start address and a function end address are recorded in association with the function of the operating system kernel, the function start address being the address of the first instruction of the first block and the function end address being the address of the last instruction of the last block. At the end of this third phase, all of the kernel functions are located insofar as, for each function, its start address and its end address are known: the start address is the address of the first instruction of the first block of the function and the end address is the address of the last instruction of the last block of the function.

Figure 2:
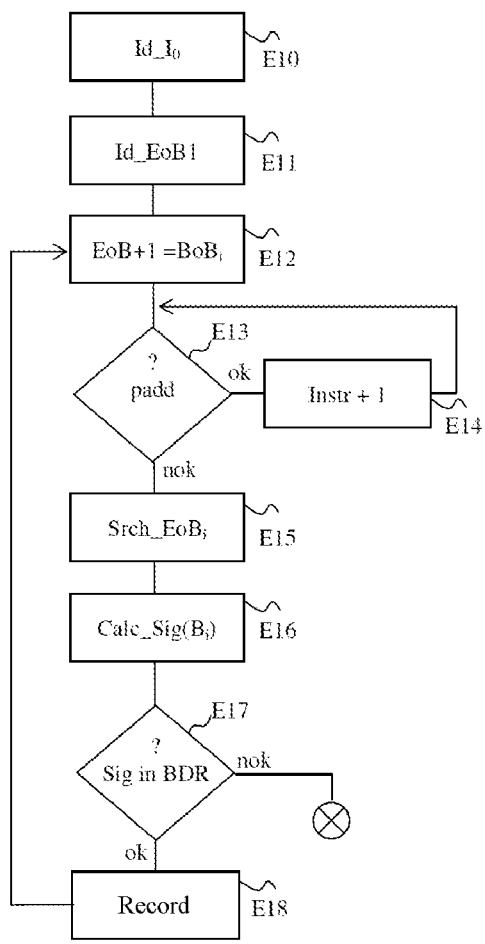
FIG. 2 is a depiction of the steps of the phase of identifying the initial instruction and of locating the following blocks of the identification method, according to one exemplary embodiment.

The steps of phase P1 of identifying the initial instruction and of locating the following blocks of the identification method will now be described with reference to FIG. 2.

In an initial step E10 of identifying the initial instruction, an initial instruction, denoted $I_0$, is identified, it being certain that it belongs to the code of the kernel. As the memory space dedicated to the code of the kernel forms a contiguous space in memory, it is certain that the kernel functions are all located in an area that contains the initial instruction $I_0$. Thus, even if the memory address range of the area of the kernel is not known, it is possible, starting from the initial address $I_0$, to search in the memory area that precedes and the memory area that follows the initial instruction $I_0$ for all of the kernel functions, and thus delimit the kernel area.

Information for which it is certain that it is situated in the kernel space is identified and located. For example, in the x86 hardware architecture, it is known that there is a special register of the processor, called "IA32_SYSENTER_EIP", that points to the first instruction of the system call manager (reference is made to a "dispatcher" in English). The dispatcher is used to direct system calls to an appropriate processing operation, that is to say to the correct kernel function. It is moreover known that this register belongs to the code of the kernel. The instruction pointed at by the register is thus able to be selected as initial instruction $I_0$. IA32_SYSENTER_EIP is an exemplary register. There are other registers that are able to serve to identify the initial instruction $I_0$.

Once the initial instruction $I_0$ has been located, the instructions are disassembled starting from the initial instruction $I_0$ in order to identify the blocks of functions contained between the initial instruction $I_0$ and the end of the code of the kernel.

As a reminder, a disassembler is a program that translates machine language, therefore an executable file, into assembler language, or "low-level" language, which represents the machine language in a form understandable to a human. To this end, use is made of disassembler libraries, for example the library called Udis86 that runs in the kernel space. Upon disassembly, it is possible to know how many bytes should be taken into account in order to correctly disassemble an instruction. This information is specifically indicated in the first byte of the instruction. Thus, if the disassembly is started from a first byte of an instruction, it is known how many bytes should be taken into account in order to disassemble the instruction.

The initial instruction $I_0$ is often situated in the middle of a block of instructions. It is therefore necessary, in order to identify complete following blocks, to position oneself at the end of the block that contains the initial instruction $I_0$.

A block end instruction is known. A first block end instruction is therefore sought in the instructions that follow the initial instruction $I_0$. Searching is performed by scanning the memory. Once this first block end instruction has been located, the following blocks of instructions are located by disassembling the instructions.

Thus, in a step E11 of identifying a first block end, the first block end instruction that follows the initial instruction $I_0$ is identified.

In a following step E12 of moving to the following instruction, there is positioning on the instruction that immediately follows the end of the block identified previously. This instruction is called current instruction.

In a test step E13, it is tested whether the current instruction is a padding instruction.

In a first case in which the current instruction is a padding instruction (branch 'ok' in FIG. 2), then in a step E14 of moving to the following instruction, there is positioning on the instruction that follows this padding instruction, and test step E13 is reiterated. Specifically, there may be a plurality of padding instructions in succession that are not significant in the identification of the blocks of instructions of kernel functions.

In a second case in which the current instruction does not correspond to a padding instruction (branch 'nok' in FIG. 2), it is certain that the current instruction is a block start instruction. A next block end instruction should then be identified, which then corresponds to that end of the block associated with the block start instruction. Thus, the instructions contained between the block start instruction and the block end instruction belong to one and the same block, called current block $B_i$.

In a following step E15 of identifying a block end, the following instructions are searched for the first block end instruction, as referenced in all of the block end instructions. At the end of step E15, the end of the current block $B_i$ has been found. All of the instructions of the current block $B_i$ are thus present; they are contained between the first instruction and the block end instruction.

In a following signature calculation step E16, the signature $S_i$ for the current block $B_i$ identified previously is calculated. More precisely, a hash function is applied to the instructions of the current block $B_i$. The hash function is the same function as the one used to construct the reference base BDR.

It should be noted that, between the first and the last instruction of the block, there may be particular instructions that manipulate all or part of an address. Such a call corresponds for example to the instruction "CALL 0xc10bb0c0", where "0xc10bb0c0" denotes the address of the code to be executed. It is known that some operating systems randomize, from one virtual machine startup to another, the address at which a code is able to be found. This is the mechanism known under the name "address space layout randomization" in English, intended to limit the effect of certain attacks that are based on fixed structures known to and documented by the processes. The calculation of the signature takes into account operation codes, or "opcode", which correspond to the actions to be executed by the processor, and register operands. In order to keep a similar signature between two identical blocks of instructions, addresses liable to be randomized are not taken into account in the calculation of the signature. These addresses may be replaced by a constant value, for example zero.

In a following step E17 of searching for a function, the reference base BDR is searched for the signature $S_i$ for the code of the current block $B_i$. This search is intended to identify the function(s) in which the current block $B_i$ appears.

In a first case in which the signature $S_i$ for the current block $B_i$ is not found in the reference base BDR (case 'nok' in FIG. 2), the method stops. Specifically, it is assumed that the reference base BDR is complete and contains all of the signatures for all of the blocks that form all of the kernel functions. If the signature for the current block $B_i$ is not found in the reference base BDR, this means that the current block $B_i$ does not belong to the code of the kernel. In this case, it is considered that the end of the preceding block corresponds to the end of the code of the kernel.

In a second case in which the signature $S_i$ for the current block $B_i$ is found in the reference base BDR (case 'ok' in FIG. 2), in a recording step E18, there is stored, in a table of blocks $TB_b$, the block start address, corresponding to the address of the first instruction of the current block $B_i$, and the block end address, corresponding to the address of the last instruction of the current block $B_i$, in association with the name of the function(s) that was (were) found in the reference base BDR. Specifically, it is possible for a block, that is to say the instructions of this block, to be present in a plurality of functions. This may be the case in particular for blocks that contain few instructions.

If the signature for the current block $B_i$ is found in the reference base BDR, steps E12 to E18 are iterated until the end of the kernel space.

At the end of these steps, the table of blocks $TB_b$ contains all of the blocks that have been identified starting from the initial instruction $I_0$ until the end of the kernel space. More precisely, a record associated with a block comprises a block start address that corresponds to the address of the first instruction of the block and a block end address that corresponds to the address of the last instruction of the block, and the name of one or more functions in which the block of instructions appear(s).

Figure 3:
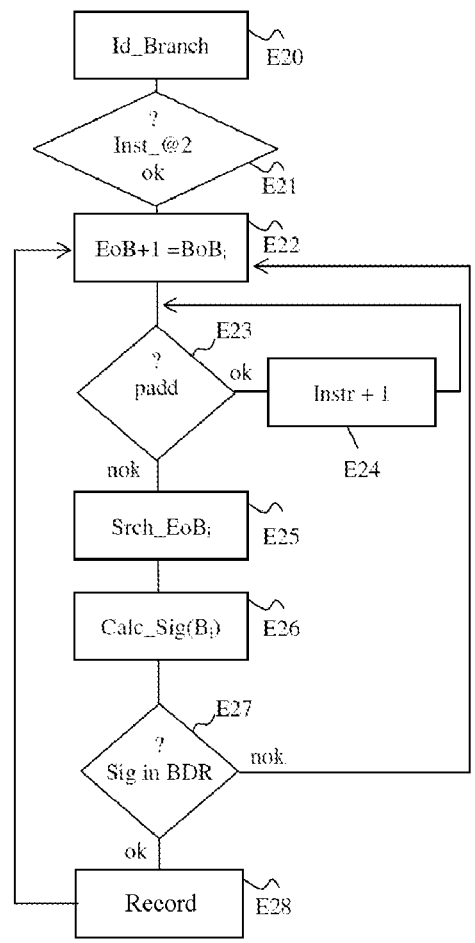
FIG. 3 is a depiction of the steps of the phase of locating the blocks that precede the initial instruction in memory, according to one exemplary embodiment.
Figure 4:
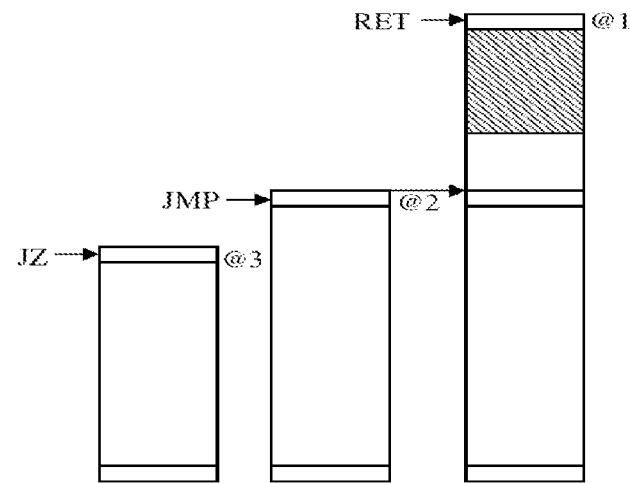
FIG. 4 is a schematic depiction of a memory area, and illustrates the mechanism implemented in the phase of locating the blocks that precede the initial instruction in memory, according to one exemplary embodiment.

The steps of phase P2 of locating the blocks that precede the initial instruction in memory will now be described with reference to FIGS. 3 and 4.

It is more complicated to identify the blocks that precede the initial instruction $I_0$ than those that follow it. Specifically, the instructions of the x86 processor have variable sizes, from one to several bytes, and are not aligned in memory. It is therefore difficult to disassemble binary code in assembler by going through the memory, as it is never certain that a byte corresponds to an instruction start, and it is not known whether a byte corresponds to an instruction or to an operand. Moreover, for the x86 processor, every byte has a meaning. It is therefore possible to disassemble the second byte of an instruction that comprises several thereof and to obtain an instruction that exists in assembler language. For all that, the assembler code that is obtained does not correspond to the binary instruction that started at the preceding byte. Lastly, it is not known where to position oneself in the memory in order to disassemble the binary code, since it is not known where the code of the kernel starts.

In order to correctly disassemble the binary code that precedes the initial instruction $I_0$, a known self-repairing disassembly mechanism (as it is known in English) is cleverly used. This mechanism provides that sequences of instructions obtained by disassembling a binary code starting from various addresses in the memory and as far as a given address, for example here the initial address $I_0$, finish by resynchronizing to correct instructions, possibly after a few different instructions that correspond, for at least one of the two sequences, to incorrect instructions. Thus, if the disassembly of a sequence of instructions does not start on the first byte of an instruction, by virtue of this self-repairing mechanism, the disassembler finishes by resynchronizing with the stream of following instructions.

Appendix 1 makes it possible to illustrate this mechanism. The correct assembler code of the function "sys_getpid", which makes it possible to return a process identifier, is given in the left-hand column. It is obtained for example by disassembling the associated binary code. The right-hand column shows the disassembly of the binary code from the instruction situated at the address 0x106be02. In the left-hand column, it is noted that the instruction "mov ebp, esp" is situated at the address 0x106be01 and occupies two bytes. In the right-hand column, the disassembly started at the address 0x106be02, which corresponds to the second byte of the instruction. At this address, the disassembler identified an instruction, in this case "in eax, 0x3e", different from the instructions appearing in the function "sys_getpid". It is also noted that, starting from the address 0x106be08, the instructions that appear in the two columns are identical. It is the self-repairing mechanism that has produced its effect. The disassembly has resynchronized to the correct instructions. In general, there are not more than a few instructions, at most five instructions, before the code is resynchronized.

The method for identifying the blocks constituting functions that precede the initial instruction $I_0$ in memory uses this disassembly self-repairing mechanism to identify the function blocks that appear before the initial instruction $I_0$ that is known to be a correct instruction.

Thus, in an initial step E20 of locating a plurality of block end instructions, the code that precedes the initial instruction $I_0$ is searched, by analyzing the code byte by byte, for addresses in which there are, or appear to be, selected block end instructions. In one exemplary embodiment, illustrated by FIG. 4, three different block end instructions are sought: a return instruction "RET", an unconditional jump instruction "JMP", and a conditional jump instruction, for example the jump instruction "JZ" if the zero flag is at 1. In this example, it is intentionally selected to limit the number of block end instructions that are sought to a few in order to optimize processing times. It is assumed that three addresses, denoted @1, @2 and @3 in FIG. 4, have been identified in an area of the disassembled memory that precedes the initial instruction $I_0$. The first address, @1, is the one furthest from the initial instruction $I_0$, and the third address, @3, is the one closest to the initial instruction $I_0$. The second one, @2, is situated between the two of them. These three addresses thus define three memory areas that are shown schematically by three columns in FIG. 4.

In this exemplary embodiment, a safety distance is taken into account, such that at least seventy-five bytes separate the first and the second block end instructions that are situated at the addresses @1 and @2, respectively. It is considered that, on average, the self-repairing mechanism acts quickly, and that, within a maximum of five instructions, the instructions are resynchronized. Moreover, it is considered that, on average, an instruction is coded on five bytes. The safety distance between the addresses @1 and @2 thus makes it possible to guarantee that the self-repairing has taken effect before the second address @2. Moreover, the third block end instruction situated at the third address @3 is not analyzed as such, but makes it possible to obtain more correct instructions. These selections are intended to facilitate disassembly and to optimize, in terms of effectiveness, the searching of the blocks of instructions in the memory area that precedes the initial instruction $I_0$.

In a checking step E21, it is checked that, during disassembly starting from the first instruction situated at the address @1 and as far as the initial address $I_0$, the instruction that appears at the second address @2 corresponds to the second block end instruction. In other words, it is checked that the instruction that appears at the start of the second column corresponds to the one that is situated at the same address in the first column. In this case, this means that this instruction is correct. In FIG. 4, it is assumed that the resynchronization of the code takes effect after the instructions that appear in the hatched part, shown in the third column. The blocks of instructions contained between the correct instruction that has just been identified and that corresponds to the second instruction and the initial instruction $I_0$ that is known to be correct should then be identified. The correct instruction is an instruction representative of a block end. The identification of blocks of instructions is similar to the identification of blocks such as implemented during steps E12 to E18.

Thus, in a step E22 of moving to the following instruction, there is positioning on the instruction that immediately follows the end of the block identified previously. This instruction is called current instruction.

In a following test step E23, comparable to step E13, it is checked whether the current instruction is a padding instruction. In a first case in which the current instruction is a padding instruction (branch 'ok' in FIG. 3), then in a step E24 of moving to the following instruction, there is positioning on the instruction that follows this padding instruction, and step E23 is iterated. In a second case in which the current instruction does not correspond to a padding instruction (branch 'nok' in FIG. 3), the current instruction is identified as a block start instruction. The next block end instruction should then be identified, which then corresponds to that end of the block associated with the block start instruction. This block is called current block $B_i$.

In a following step E25 of identifying a block end instruction, and in a manner comparable to step E15 described above, the following instructions are searched for the first block end instruction. This instruction is representative of the end of the current block $B_i$.

A signature is then calculated in a calculation step E26, comparable to step E16, the signature $S_i$ for the instructions that form the current block $B_i$.

In a following search step E27, comparable to step E17, the reference base BDR is searched for the signature $S_i$ for the instructions of the current block $B_i$, which signature is calculated during step E26 in order to identify the function(s) in which the current block $B_i$ appears.

In a first case in which the signature $S_i$ for the current block $B_i$ is not found in the reference base BDR (case 'nok' in FIG. 3), it is assumed that the current block $B_i$ does not form part of the code of the kernel. In this case, the following blocks should be identified and it should be checked whether these blocks belong to the kernel. The method returns to step E22 so as to identify one or more following blocks.

In a second case in which the signature $S_i$ for the current block $B_i$ is found in the reference base BDR (case 'ok' in FIG. 3), then, in a following recording step E28, there is stored, in the table of blocks $TB_b$, the block start address, corresponding to the address of the first instruction of the current block $B_i$, and the block end address, corresponding to the address of the last instruction of the block, in association with the name of the function(s) that was (were) found in the reference base BDR.

If the signature for the current block $B_i$ is found in the reference base, steps E22 to E28 are iterated until the block end instruction that follows the initial instruction $I_0$.

Steps E20 to E28 are then repeated on a code area that precedes the block start instruction identified during test step E23.

At the end of these iterations, the table of blocks $TB_b$ contains all of the blocks that have been identified in the kernel space. Specifically, the table of blocks $TB_b$ that contained the blocks identified starting from the initial instruction $I_0$ as far as the end of the kernel space has been filled in with the blocks of the kernel area that precede the initial instruction $I_0$. For each block, the table of blocks $TB_b$ contains the address of the first instruction of the block and the address of the last instruction of the block. The table also contains, for each block, the name of the function(s) in which the signature for the block was found. Lastly, in one exemplary embodiment, the table also stores the signature for the block.

The steps of phase P3 of grouping the blocks into a function, according to one exemplary embodiment, will now be described and illustrated with reference to appendix 2.

At the end of the steps described above, the entire memory space of the kernel code of the virtual machine has been scanned, and all of the blocks that form all of the kernel functions have been located. A block, more precisely the signature for this block, may have been found in a plurality of functions. However, for such a block, the addresses of the first instruction and of the last block instruction are different. Specifically, these blocks appear at various locations in the memory. Thus, the table of blocks $TB_b$ may contain a plurality of rows that differ only in terms of the block start and end address.

Appendix 2 shows an extract from the table of blocks $TB_b$. In this extract, and for the sake of clarity, the block signatures have been removed.

In the grouping phase P3, the blocks that belong to the same function should then be grouped in order to define the functions. This grouping is intended to identify, for each kernel function, a start address and an end address. The start address corresponds to the address of the first instruction of the first block that forms the function and the end address to the address of the last instruction of the last block of the function.

To implement the steps of the grouping phase, the table of blocks $TB_b$ is reorganized by increasing order of the addresses of the first instructions of the blocks, as illustrated in appendix 2. Appendix 2 shows various scenarios that may be encountered in the sequence of the blocks.

The steps of the grouping phase are described here following the order of the scenarios shown in the appendix. Of course, the invention is not limited to such an order, and is not limited either to such records.

The table of blocks $TB_b$ is run through in increasing order of the addresses of the memory of the kernel area.

In a first scenario, illustrated by rows 1 to 4 of the table of blocks $TB_b$, the association of the blocks with a function is relatively rapid. Thus, a first record that corresponds to a current block that appears on the first row of the table of blocks TB$_b$ is analyzed. The current block is associated with a current function. There is no doubt that the current block is the first block or initial block of the current function "sys_close". The start address of the first block, 0xc10b2296, is therefore associated with the start address of the current function "sys_close" in a table of functions TB$_F$.

A following record, represented by the second row of the table of blocks TB$_b$, is analyzed, and the block described by this record becomes the current block. It is checked whether the current block belongs to the current function, in this case "sys_close". As a single function name is associated with the current block, and this is the same as the name of the current function, the current block therefore belongs to the current function "sys_close", and only to this function. The preceding steps are iterated on following records, until the name of the function associated with the current block in the table of blocks TB$_b$ is different from the name of the current function of the block analyzed during the preceding step, or until a plurality of other function names are referenced. Thus, the steps are iterated until the record that appears on the fourth row of the table of blocks TB$_b$. Specifically, for this record, the name of the function associated with the current block, "do_sys_open", is different from the name of the current function "sys_close". This means that the preceding block, analyzed in the preceding step, constituted the last block of instructions of the current function "sys_close", and the current block, which does not appear in the function "do_sys_open", is the first block of this function. The table of functions TB$_F$ is updated: the address of the last instruction of the preceding block, 0xc10b2322, is recorded as the address of the last instruction of the current function "sys_close". The function "do_sys_open" becomes the current function. The address of the first instruction of the current block, 0xc10b2323, is recorded as the start address of the current function "do_sys_open" in the table of functions TB$_F$.

The analysis of the following records corresponds to a second scenario.

In a step of changing to the following block, a following record, which appears on the fifth row of the table of blocks TB$_b$, is analyzed, and the described block becomes the current block. It is checked whether the current block belongs to the current function, "do_sys_open". As the current block appears only in the function "do_sys_open", it belongs to the current function "do_sys_open" and only to this function. The following records are analyzed, until the name of the function associated with the current block is different from the name of the current function of the block analyzed during the preceding step, or until a plurality of other function names are referenced. Thus, the analysis continues until the record associated with the sixth row of the table of blocks TB$_b$. The current block associated with this record potentially belongs to a plurality of functions, in this case either "do_sys_open" or "keyring_read".

In a following test step, it is checked whether the current function, "do_sys_open", is listed among the function names associated with the current block.

In a first case, satisfied here, in which the name of the current function appears, then it is considered that the current block belongs to the current function "do_sys_open". Specifically, due to the proximity in memory of the blocks of instructions relating to a function, it is considered that the current block is able to belong only to the current function. It should be noted that, in a second case, the name of the current function might not have formed part of the names of the functions associated with the current block. In this case, the block preceding the current block would have been the last block of the current function "do_sys_open", and the table of functions TB$_F$ would have been updated as a result.

In a following step, a following record shown by the seventh row of the table of blocks TB$_B$ is analyzed. The associated block becomes the current block.

This corresponds to a third scenario.

In an analysis step, the current block is analyzed. The block potentially appears in a plurality of functions, in this case "vmi_update_pte" and "vmi_update_pte_defer". It is checked whether the name of the current function "do_sys_open" appears in the list of function names. The name of the current function does not appear. This means that the last block of the current function "do_sys_open" is the preceding block represented on the sixth row of the table. The table of functions TB$_F$ is updated as a result, and the information regarding the current function "do_sys_open" is recorded: the address 0xc10b2401 is recorded as the end address of the function "do_sys_open".

The current block corresponds to the first block of a new current function. It is not known at this stage which function is involved.

The following blocks are then analyzed. The block represented by the record that appears on the eighth row of the table of blocks TB$_B$ does not allow the current function to be identified. The block represented by the record that appears on the ninth row belongs to just a single function, "vmi_update_pte", which formed part of the function names listed for the preceding blocks. The current function associated with the blocks represented by the sixth, seventh and eight rows is therefore "vmi_update_pte".

The information in the table of functions TB$_F$ is updated: the address 0xc101a340 of the first instruction of the first block of the current function represented on the seventh row of the table of blocks TB$_B$ is recorded as the address of the first instruction of the function "vmi_update_pte".

In a following step, the block represented by the record that appears on the tenth row of the table of blocks TB$_B$ becomes the current block, and it is analyzed. The current block potentially belongs to two functions, "vmi_update_pte" or "vmi_update_pte_defer". The name of one of the functions, in this case "vmi_update_pte", is the name of the current function associated with the preceding block. In this case, either the current block belongs to the current function, "vmi_update_pte", or the current block is the first block of the function "vmi_update_pte_defer".

To identify the function to which the current block belongs, the signature for the first block of the current function, in this case "vmi_update_pte", is compared with the signature for the current block, represented by the record that appears on the tenth row of the table of blocks TB$_B$. If the signature is identical, this means that the current block is the first block of a function. Specifically, it is considered that a first function block is representative of a function start, as it generally contains instructions specific to a function, for example initialization instructions. The current block therefore cannot belong to the current function, as there cannot be a second function start block in the current function. In other words, the current block cannot belong to the current function "vmi_update_pte". It is therefore necessarily a start block of another function.

In this case, the preceding block was the last block of the current function, "vmi_update_pte", and the current block is the first block of a new function, in this case "vmi_update_pte_defer". It should be noted that, if the current block were to appear in more than two functions, the name of the new function could not be known at this stage. The name of the new function would then be determined by continuing to analyze the records.

In a following step, the table of functions $TB_F$ is updated: the address of the last instruction of the preceding block, 0xc101a377, is recorded as the address of the last instruction of the current function "vmi_update_pte". For this example, the current function becomes "vmi_update_pte_defer", and the address of the first instruction of the current block, 0xc101a37d, is recorded as the start address of the current function "vmi_update_pte_defer".

The following blocks are analyzed. The block represented by the record that appears at the twelfth row corresponds to the last block of the function "vmi_update_pte_defer". The table of functions $TB_F$ is updated as a result.

The analysis is thus continued on the table of blocks $TB_b$, which then contains all of the blocks located in the kernel space.

At the end of this analysis, the table of functions $TB_F$ contains, for all of the functions of the operating system kernel of the virtual machine, a start address and a function end address that correspond to the first instruction of the first block of the function and to the last instruction of the last block of the function, respectively. The table of functions $TB_F$ thus provides a map of the operating system kernel in terms of kernel functions. It should be noted that this information was determined without knowledge a priori of the operating system running on the virtual machine.

The steps of a method for constructing a reference base that contains, for at least one given operating system, all of the signatures for the blocks that form the functions of the operating system kernel, according to one exemplary embodiment, will now be described with reference to FIG. 5.

For each operating system, or even each version of an operating system, there is documentation that associates, with each function of the operating system, an address in memory that corresponds to the address of the first instruction of the function, or function start address. The functions referenced in the documentation are ordered insofar as one function described after another one follows this other function in memory. In other words, the start address of the function follows the last instruction of the other function in memory. It should be noted that, in some cases, it is possible for padding bytes to separate the start of the function from the last instruction of the other function in memory.

The method for constructing the reference base BDR introduces the concept of a block into a function. A function is formed of blocks of instructions. Constructing the reference base BDR therefore consists in identifying and in referencing all of the blocks that constitute the kernel functions.

Figure 5:
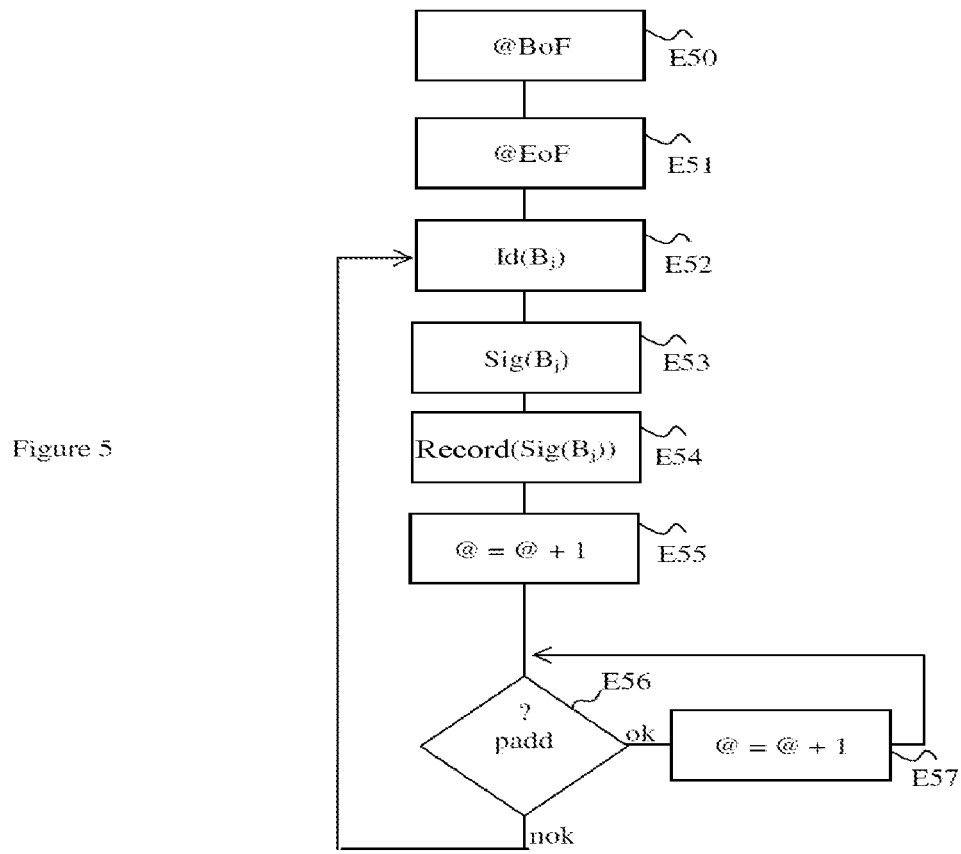
FIG. 5 shows the steps of a method for constructing a reference base of signatures for blocks of instructions, according to one exemplary embodiment.

The steps of the method for creating the reference base BDR are implemented in a learning environment (not shown in FIG. 5). In this environment, a host server of a cloud computing architecture hosts a virtual machine (not shown) whose operating system is known. It is assumed that there is also documentation associated with the operating system of the virtual machine. The documentation provides, for each kernel function, a function start address that corresponds to the address of the first instruction of the function, in association with the name of the function.

In an initial step E50, the address of the first kernel function, provided in the documentation, is associated with the start address of a current function and with the start address of a current block $B_j$.

In a step E51 of determining an end address of the current function, the address that immediately precedes, in memory, the start address of the function that follows the current function in the documentation is calculated. This address is associated with the end address of the current function.

In a following step E52 of determining a block, a block end instruction is sought in a memory area that follows the start address of the current block, and which precedes the end address of the current function. The instructions contained between the start address of the current block and the block end instruction constitute the instructions of the current block $B_j$.

In a following step E53 of calculating a signature, a cryptographic signature for the instructions of the current block is calculated by way of a hash function. In one exemplary embodiment, the hash function used is MD5 (from the English "Message Digest 5"). Of course, the invention is not limited to this function, and functions such as SHA-2 or SHA-3 (from the English "Secure Hash Algorithm") may also be used. It should be noted that addresses liable to be randomized, in accordance with the known mechanism for the random distribution of the address space, are not taken into account for the calculation of the signature. When such addresses are encountered, they are replaced with a constant value, for example zero.

In a recording step E54, the signature for the current block $B_j$ is recorded in the reference database BDR, in association with the name of the current function.

In a movement step E55, the start address of a following block is positioned on the address that follows the end address of the current block in memory. This block becomes the current block.

In a test step E56, it is checked whether the instruction that appears at the start address of the current block $B_j$ corresponds to a padding byte. In a first case in which a padding byte is involved (case 'ok' in FIG. 5), the start address of the current block $B_j$ is positioned on the following address in a movement step E57 and step E56 is executed. In a second case in which the first instruction of the current block does not correspond to a padding byte (branch 'nok' in FIG. 5), then steps E52, E53 and E54 are executed so as to identify the end instruction of the current block $B_j$ to calculate the signature for the instructions and to record this signature in the reference base in association with the name of the function.

Steps E52 to E57 are iterated until all of the blocks contained between the start address of the current function and the end address have been processed.

Steps E50 to E57 are then iterated for a following function. The following function is a function that follows the current function in memory, and therefore in the documentation. The following function becomes the current function when the steps are executed.

It should be noted that one and the same block of instructions may appear in various functions. This may be the case for blocks that contain very few instructions. In this example, the reference base BDR associates, with the signature for the block, the name of all of the functions in which it appears.

Once all of the functions of the documentation of the operating system of the virtual machine have been analyzed, the reference database BDR contains the signatures for all of the blocks of instructions of all of the kernel functions. There is associated, with each signature, the name of the function(s) to which the block belongs.

The learning phase is implemented on all of the operating systems that it is desired to reference and for which there is documentation.

The reference base BDR thus obtained does not draw a distinction between the operating systems. It associates a signature for a block of instructions with one or more functions, independently of any operating system.

Once the steps of the method for identifying at least one function of an operating system kernel of a virtual machine have been implemented, it is possible to supervise the execution of a virtual machine on which this operating system is running. Such supervision may prove useful in the context of detecting malicious acts, by observing calls and call ends for kernel functions, or even in the context of a reaction following the detection of malicious acts. The following methods describe how the method for identifying at least one kernel function may be used to implement supervision of virtual machines.

Figure 7:
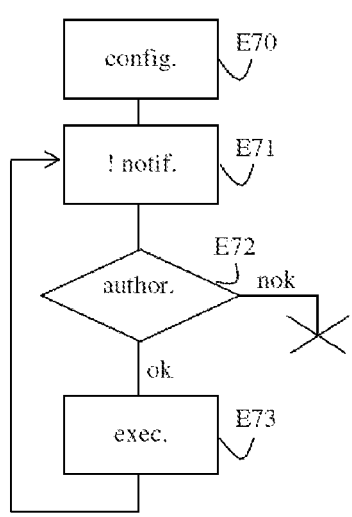
FIG. 7 shows the steps of a method for supervising the execution of a virtual machine, according to one exemplary embodiment.

The steps of a first supervision method, according to one exemplary embodiment, will now be described with reference to FIG. 7. These steps are implemented by a supervision module that comprises software instructions that are intended to notify a security administrator of the execution of a kernel function. In the example described here, the supervision module is contained in the hypervisor.

It is assumed, for the virtual machine whose execution it is desired to supervise, that there is the table of functions $TB_F$ constructed when the method for identifying at least one kernel function is implemented. This table contains, for all of the functions of the operating system kernel of the virtual machine, the function start and end addresses associated with the name of the function.

In an initial configuration step E70, the security administrator identifies, in the context of the supervision that he wishes to establish, the functions of the operating system kernel of the virtual machine about whose execution he wishes to be notified. For example, the administrator wishes to be informed of the execution of the function "kill", which makes it possible to send a signal to a process. In one exemplary embodiment, the administrator commands the supervision module to position, within a memory area allocated to the virtual machine, bits associated with the execution mode of a memory page containing the first instruction of the kernel function "kill" at "non-executable". The supervision module knows, by virtue of the table of functions $TB_F$ associated with the virtual machine, the address of the input point of the function "kill", and therefore the memory page that contains the bits to be positioned at non-executable. This has the effect of making the kernel function "kill" non-executable.

In a following notification step E71, implemented during the execution of the virtual machine, the administrator receives, via the supervision module, a notification of an attempt to execute the kernel function "kill". More precisely, as the execution mode of the functions contained in the memory area containing the first instruction of the kernel function "kill" has been positioned at non-executable, an attempt to execute the function "kill" by the operating system of the virtual machine generates an exception at the level of the operating system, which causes the virtual machine to stop. The hypervisor is notified of this exception, and it informs the supervision module of this.

In a following selection step E72, the supervision module selects to authorize or not to authorize the execution of the kernel function "kill". The authorization may be requested explicitly from the security administrator. If the execution is authorized (branch 'ok' in FIG. 7), the execution of the virtual machine resumes during resumption step E73. In a second case in which the execution is not authorized (branch 'nok'), the method stops. In another exemplary embodiment, the selection may be configured at the level of the supervision module: the notification may give rise to an explicit message on a control panel or in a log, the notification may automatically stop the execution of the virtual machine, etc.

The example described here corresponds to active supervision of the execution of the virtual machine insofar as the hypervisor receives information regarding the state of the virtual machine in real time, in accordance with the configuration established during initial step E70.

In another example of supervision by notification to the hypervisor, the supervision module injects one or more activity interception instructions into the code of a kernel function whose execution it wishes to supervise. More precisely, the supervision module saves the first instruction of the function, in order possibly to emulate it later on, and replaces this first instruction with an activity interception instruction designed to interrupt the function and notify. For example, the instructions "VMcall" or "int3" are known, these interrupting the execution of the virtual machine and sending a notification to the hypervisor.

In another example of supervision, it is the end of the execution of a function that is supervised for the purpose of notifying the hypervisor. The processing of the call end interception is similar to the preceding case: the supervision module injects one or more activity interception instructions at the function end instruction, and also at possible other output points of the function for which the hypervisor wishes to be notified. In this case, the other output points are recognized by scanning the instructions contained between the first instruction of the function and the last instruction. The relevant output points in the context of the supervision are then replaced with an activity interception instruction. The execution of these instructions is then notified to the hypervisor. Supervising the end of the execution of a function makes it possible to know the result of the function, possibly to modify it, to add a processing operation, etc.

Figure 8:
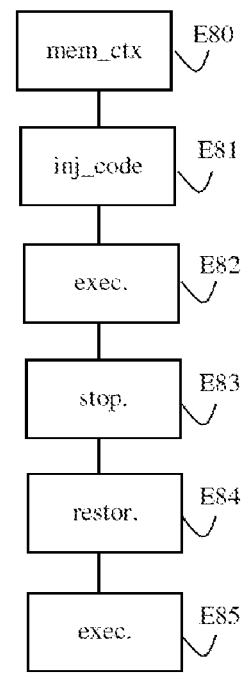
FIG. 8 shows the steps of a method for supervising the execution of a virtual machine, according to a second exemplary embodiment.

The steps of a second supervision method, according to one exemplary embodiment, will now be described with reference to FIG. 8. These steps are implemented by a call injection supervision module. In the example described here, the call injection supervision module is a software module contained in the hypervisor.

In this exemplary embodiment, the security administrator commands, via the supervision module, the execution of a function of the operating system kernel on the virtual machine. Such a command may be associated with a reaction following the detection of a malicious act on the virtual machine. In this case, the administrator wishes for example to command the execution of the function "kill".

In a saving step E80, the supervision module commands the hypervisor to save the context of the processor associated with the virtual machine. To this end, the virtual machine is temporarily stopped, and the address of the current instruction, also denoted by "IP" (for "instruction pointer"), and the registers associated with the processor, are saved.

In a following injection step E81, the supervision module commands the execution of the kernel function. To do this, it positions the instruction register, or IP, at the address of the function "kill" that appears in the table of functions $TB_F$ associated with the virtual machine. The supervision module also loads the parameters of the function "kill" as defined by the prototype of the function in the appropriate registers, or the stack as the case may be.

In a following resumption step E82, the supervision module commands the resumption of the execution of the virtual machine. The kernel function "kill" is then executed. The function "kill" returns a result that is recorded and analyzed by the supervision module.

In a second stoppage step E83, the supervision module commands the stoppage of the virtual machine.

In a following restoration step E84, the registers of the processor of the virtual machine are restored on the basis of the saved values, and the instruction pointer is positioned at the value that was initially saved.

In a resumption step E85, the supervision module commands the resumption of the execution of the virtual machine.

This supervision mode constitutes active supervision of the virtual machine by function call injection.

In another exemplary embodiment, the supervision module is designed to implement passive supervision by function call injection. For example, what is happening at the virtual machine in terms of active processes is observed at regular intervals. In this case, there is provision to execute the kernel functions that list the active processes at regular intervals.

A device for identifying at least one function of an operating system kernel, according to one exemplary embodiment, will now be described with reference to FIG. 6.

Figure 6:
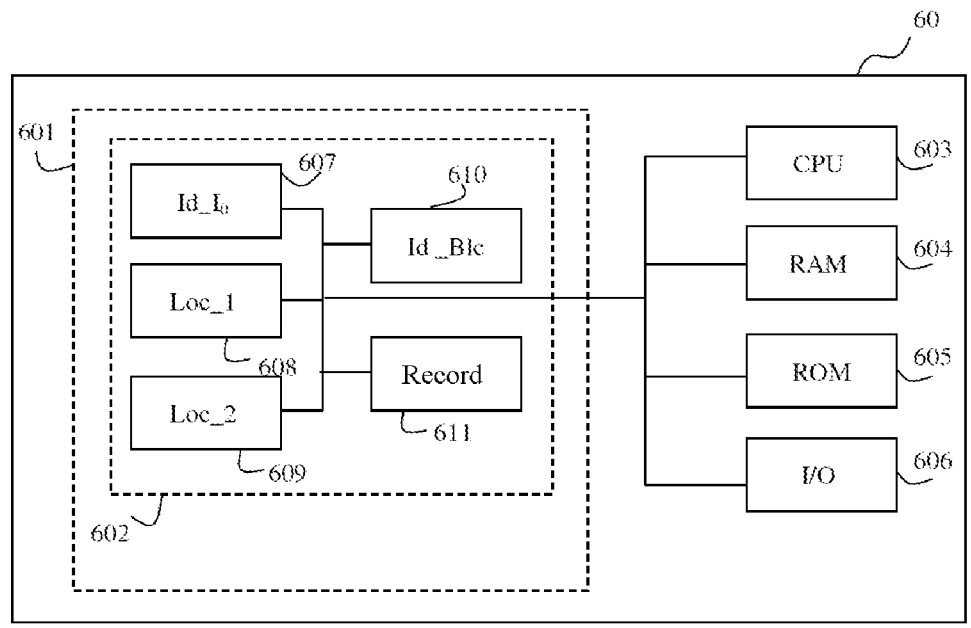
FIG. 6 is a schematic depiction of a device for identifying at least one function of an operating system kernel, according to one exemplary embodiment.

The device 60 for identifying at least one function of an operating system kernel is a computer apparatus such as a host server, designed to host at least one virtual machine (not shown in FIG. 6). The identification device 60 comprises a virtualization layer intended to host a hypervisor 601. In one exemplary embodiment, the hypervisor comprises a module 602 for identifying the functions of an operating system kernel. The identification module 602 comprises code instructions for implementing the steps of the method for identifying the functions of an operating system kernel such as described previously. The hypervisor 601 is designed to virtualize hardware resources of the device 60 so as to provide virtual machines that it hosts with the resources that they require. The device 60 for assisting in the analysis of the execution of a virtual machine conventionally comprises:

- a microprocessor 603, or "CPU" (from the English "central processing unit"), intended to load instructions in memory, to execute them, to perform operations,
- a set of memories, including a volatile memory 604, or "RAM" for ("random access memory"), used to execute code instructions, store variables, etc., and an "EEPROM" storage memory 605 (from the English "electronically erasable programmable read-only memory"). The storage memory 605 is designed to store an application that comprises code instructions for implementing the steps of the method for identifying the functions of an operating system kernel of at least one virtual machine. In particular, it stores code instructions for implementing the module 602 for identifying the functions of the hypervisor 601 in the virtualization layer. In one exemplary embodiment, the storage memory 605 is also designed to store the tables of functions $TB_F$, a table being associated with a virtual machine. In another exemplary embodiment, it is also designed to store the reference base BDR.
- communication interfaces 606, designed so that the entities communicate. In particular, the interfaces 606 are designed to facilitate communication with the virtual machines and their operating system. The communication interfaces 606 are also designed to access the reference database BDR and the tables of functions $TB_F$ of the addresses of the functions of the operating system kernel of the virtual machines.

It is understood, in the light of the description and of the context of a cloud computing architecture, that the microprocessor 603, the memories 604, 605 and the communication interfaces 606 are hardware resources of a hardware execution layer of the device 60. These resources are intended to be virtualized by the hypervisor 601 and made available to the virtual machines in virtualized form.

The device 60 for identifying at least one function of an operating system kernel also comprises:

- a module 607 for identifying an initial instruction, designed to identify an initial instruction $I_0$ contained in a memory area allocated to the code of the operating system kernel of the virtual machine,
- a first location module 608, designed to locate at least one following block of instructions contained in at least one function of the operating system kernel of the virtual machine, said following block being situated in a memory area that follows the initial instruction,
- a second location module 609, designed to locate at least one preceding block of instructions contained in at least one function of the operating system kernel of the virtual machine, said preceding block being situated in a memory area that precedes the initial instruction,
- an identification module 610, designed to identify, from among the at least one following block and the at least one preceding block, a first block and a last block of instructions of the function of the operating system kernel,
- a recording module 611, designed to record a function start address and a function end address in association with the function of the operating system kernel, the function start address being the address of the first instruction of the first block and the function end address being the address of the last instruction of the last block.

The module 607 for identifying an initial instruction, the first location module 608, the second location module 609, the identification module 610 and the recording module 611 are preferably software modules comprising software instructions for executing the steps of the previously described method for identifying the functions of an operating system kernel.

The invention therefore also relates to:

- a computer program including instructions for implementing the method for identifying the functions of an operating system kernel such as described previously when this program is executed by a processor of the device for identifying at least one function 60,
- a readable recording medium on which the above-described computer program is recorded.

The software modules may be stored in or transmitted by a data medium. The latter may be a hardware storage medium, for example a CD-ROM, a magnetic floppy disk or a hard disk, or else a transmission medium such as a signal or a telecommunication network.

In one exemplary embodiment, the device 60 for identifying the functions of an operating system kernel comprises a module for creating the reference base (not shown in FIG. 6). In this case, the device 60 for identifying at least one kernel function also comprises the following modules (not shown in FIG. 6):

- a first address-obtaining module, designed to obtain the start address of a first reference function, the start address of the first reference function being associated with the name of the first reference function in documentation of the operating system, and obtaining, from the documentation, the start address of a following reference function, an association module, designed to associate a memory address preceding the start address of the second reference function with an end address of the first reference function, an identification module, designed to identify, between the start address of the first reference function and the end address of the first reference function, at least one block of instructions, the last instruction of said block being a block end instruction, a calculation module, designed to calculate a signature for said identified block of instructions, a recording module, designed to record said signature for the block in the reference base in association with the name of the first reference function.

These modules are preferably software modules, designed to implement the steps of the learning phase of the method for assisting in the analysis of the execution of a virtual machine such as described previously.

In the exemplary embodiment described here, the module 602 for identifying the functions of an operating system kernel and the module for creating the reference base are contained in the hypervisor 601. In another exemplary embodiment, these modules are separate from the hypervisor 601. For example, virtual machines are hosted on a second host server and the module 602 for identifying the functions of an operating system kernel dialogs with the hypervisor of the second host server in order to implement the steps of the method for identifying the functions of an operating system kernel of a virtual machine such as described previously. It is recalled that the phase of creating the reference base may be implemented independently of the virtual machines of the host server 60.

APPENDIX 1

<sys_getpid> Kernel 3.13.1:

| | | | |
|---|---|---|---|
| 0xc106be00 | push ebp | | |
| 0x106be01 | mov ebp, esp | 0xc106be02 | in eax, 0x3e |
| 0xc106be03 | lea esi, [ds:esi] | 0xc106be04 | lea esi, [esi] |
| 0xc106be08 | mov eax, [fs:0xc1a4dfd4] | 0xc106be08 | mov eax, [fs:0xc1a4dfd4] |
| 0xc106be0e | mov ax, [eax+0x248] | 0xc106be0e | move ax, [eax+0x248] |
| 0xc106be14 | mov eax, [eax+0x264] | 0xc106be14 | mov eax, [eax+0x264] |
| 0xc106be1a | call 0x7cc0 | 0xc106be1a | call 0x7cc0 |
| 0xc106be1f | pop ebp | 0xc106be1f | pop ebp |
| 0xc106be20 | ret | 0xc106be20 | ret |

APPENDIX 2

$TB_b$:

1: 0xc10b2296  0xc10b22ab  sys_close

...//omitted

2: 0xc10b239f  0xc10b2317  sys_close

3: 0xc10b2319  0xc10b2322  sys_close

4: 0xc10b2323  0xc10b2330  do_sys_open

...//omitted

5: 0xc10b23ec  0xc10b23f2  do_sys_open

6: 0xc10b23f7  0xc10b2401  do_sys_open, OR keyring_read OR ...//omitted

7: 0xc101a340  0xc101a35b  vmi_update_pte, OR vmi_update_pte_defer

8: 0xc101a35d  0xc101a368  vmi_update_pte, OR vmi_update_pte_defer

9: 0xc101a36a  0xc101a377  vmi_update_pte

10: 0xc101a37d  0xc101a398  vmi_update_pte, OR vmi_update_pte_defer

APPENDIX 2-continued

11: 0xc101a39a  0xc101a3a5  vmi_update_pte , OR  vmi_update_pte_defer

12: 0xc101a3a7  0xc101a3b4  vmi_update_pte_defer

Although the present disclosure has been described with reference to one or more examples, workers skilled in the art will recognize that changes may be made in form and detail without departing from the scope of the disclosure and/or the appended claims.

The invention claimed is:

1. A method comprising:
identifying, by a device, at least one function of an operating system kernel of a virtual machine, said virtual machine comprising an operating system communicating with a hypervisor of a host system, said hypervisor interfacing between the operating system and hardware resources of the host system, said identifying comprising the device performing the following acts:
identifying an initial instruction contained in the code of the operating system kernel of the virtual machine,
locating at least one following block of instructions belonging to at least one function of the operating system kernel of the virtual machine, among which is comprised a last function of the operating system kernel, by scanning a computer-readable memory, said following block being situated in a memory area that follows the initial instruction,
locating at least one preceding block of instructions belonging to at least one function of the operating system kernel of the virtual machine, among which is comprised a first function of the operating system kernel, by scanning the computer-readable memory, said preceding block being situated in a memory area that precedes the initial instruction, wherein locating the at least one preceding block, situated in the memory area that precedes the initial instruction, comprises:
searching, in the memory area that precedes the initial instruction, for at least two block end instructions, a first block end instruction being situated at a first address, a second block end instruction being situated at a second address, the first address being further from the initial instruction than the second address,
implementing disassembly on instructions that follow the first address,
when an instruction obtained through disassembly from the first address and appearing in the second address corresponds to the second block end instruction, selecting the instruction that follows the second block end instruction, said instruction that follows the second block end instruction corresponding to the first instruction of the at least one preceding block, and
searching, in the memory area that follows the first instruction of the at least one preceding block, for a further block end instruction, said further block end instruction corresponding to the last instruction of the at least one preceding block,
identifying a first block of instructions of the first function of the operating system kernel and a last block of instructions of the last function of the operating system kernel from among the at least one following block and at least one preceding block, and
recording a first function start address and a last function end address in association with the first and the last functions of the operating system kernel, the first function start address being the address of the first instruction of the first block and the last function end address being the address of the last instruction of the last block.

2. The method for identifying at least one function as claimed in claim 1, wherein the initial instruction is identified by accessing a specific register of the processor.

3. The method as claimed in claim 1, wherein locating the at least one following block, situated in the memory area that follows the initial instruction, comprises:
searching, in the memory area that follows the initial instruction, for a current instruction that follows a third block end instruction, said current instruction being the first instruction of the following block,
searching, in the memory area that follows the first instruction of the following block, for a following, fourth block end instruction, said following, fourth block end instruction being the last instruction of the following block.

4. The method as claimed in claim 1, wherein the identification of the first block and of the last block of instructions of the kernel function comprises:
calculating, for each of the at least one following block and the at least one preceding block, a signature for the instructions of the block,
searching for said signature in a reference base of block signatures, said reference base containing, for at least one reference operating system, the signatures for the instructions of the blocks that form part of reference functions of said operating system kernel, a signature for the instructions of a block in the base being associated with a name of at least one reference kernel function that contains said block,
classifying the at least one following block and the at least one preceding block using a block address, and grouping successive blocks and identifying the kernel function that contains said group of blocks, a first block of the group corresponding to the first block of the kernel function and a last block of the group corresponding to the last block of the kernel function.

5. The method as claimed in claim 1, comprising, in a phase of constructing a reference base of signatures for blocks that form part of reference functions of at least one reference operating system, the following steps:
obtaining a start address of a first reference function, the start address of the first reference function being associated with a name of the first reference function in documentation of the operating system, and obtaining, from the documentation, a start address of a following reference function,
associating a memory address preceding the start address of the following reference function with an end address of the first reference function, identifying, between the start address of the first reference function and the end address of the first reference function, at least one block of instructions, the last instruction of said block being a block end instruction,
calculating a signature for said identified block of instructions,
recording said signature for the block in the reference base in association with the name of the first reference function.

6. The method as claimed in claim 1, further comprising performing the method by a supervision module of the device to supervise execution of the virtual machine, said supervision module commanding the hypervisor to inject a call of a kernel function into the virtual machine.

7. The method as claimed in claim 1, further comprising performing the method by a supervision module of the device to supervise execution of a kernel function of the virtual machine, said supervision module commanding the hypervisor to set bits associated with an executable nature of the kernel function as non-executable so that an attempt to execute the kernel function of the virtual machine generates an exception and a stop of the virtual machine, said hypervisor receiving a notification related to this exception and informing the supervisor module.

8. The method as claimed in claim 1, further comprising performing the method by a supervision module of the device to supervise execution of the virtual machine, said supervision module commanding the hypervisor to inject an activity interception instruction into code of a kernel function so as to receive a notification when said function is executed by the virtual machine.

9. The method as claimed in claim 1, further comprising performing the method by a supervision module of the device to supervise execution of the virtual machine, said supervision module commanding the hypervisor to inject an activity interception instruction into code of a kernel function so as to receive a notification at the end of the execution of said function by the virtual machine.

10. A device comprising:
a processor; and
a non-transitory computer-readable medium comprising instructions stored thereon, which when executed by the processor configure the device to identify at least one function of an operating system kernel of a virtual machine, said virtual machine comprising an operating system communicating with a hypervisor of the device, said hypervisor interfacing between the operating system and hardware resources of the device, wherein the identifying comprises:
identifying an initial instruction, designed to identify an initial instruction contained in the code of the operating system kernel of the virtual machine,
locating at least one following block of instructions contained in at least one function of the operating system kernel of the virtual machine, among which is comprised a last function of the operating system kernel, by scanning a computer-readable memory, said following block being situated in a memory area that follows the initial instruction,
locating at least one preceding block of instructions contained in at least one function of the operating system kernel of the virtual machine, among which is comprised a first function of the operating system kernel, by scanning the computer-readable memory, said preceding block being situated in a memory area that precedes the initial instruction, wherein locating the at least one preceding block, situated in the memory area that precedes the initial instruction, comprises:
searching, in the memory area that precedes the initial instruction, for at least two block end instructions, a first block end instruction being situated at a first address, a second block end instruction being situated at a second address, the first address being further from the initial instruction than the second address,
implementing disassembly on instructions that follow the first address,
when an instruction obtained through disassembly from the first address and appearing in the second address corresponds to the second block end instruction, selecting the instruction that follows the second block end instruction, said instruction that follows the second block end instruction corresponding to the first instruction of the at least one preceding block, and
searching, in the memory area that follows the first instruction of the at least one preceding block, for a further block end instruction, said further block end instruction corresponding to the last instruction of the at least one preceding block,
identifying, from among the at least one following block and the at least one preceding block, a first block of instructions of the first function of the operating system kernel and a last block of instructions of the last function of the operating system kernel,
recording a first function start address and a last function end address in association with the first and last functions of the operating system kernel, the first function start address being the address of the first instruction of the first block and the last function end address being the address of the last instruction of the last block.

11. A non-transitory computer-readable data medium comprising a computer program stored thereon able to be loaded in the memory of a computer, the program comprising code portions for executing a method for identifying the functions of an operating system kernel of a virtual machine when the program is executed on said computer, said virtual machine comprising an operating system communicating with a hypervisor of a host system, said hypervisor interfacing between the operating system and hardware resources of the host system, said method of identifying comprising:
identifying an initial instruction contained in the code of the operating system kernel of the virtual machine,
locating at least one following block of instructions belonging to at least one function of the operating system kernel of the virtual machine, among which is comprised a last function of the operating system kernel, by scanning a computer-readable memory, said following block being situated in a memory area that follows the initial instruction,
locating at least one preceding block of instructions belonging to at least one function of the operating system kernel of the virtual machine, among which is comprised a first function of the operating system kernel, by scanning the computer-readable memory, said preceding block being situated in a memory area that precedes the initial instruction, wherein locating the at least one preceding block, situated in the memory area that precedes the initial instruction, comprises:
searching, in the memory area that precedes the initial instruction, for at least two block end instructions, a first block end instruction being situated at a first address, a second block end instruction being situated at a second address, the first address being further from the initial instruction than the second address, implementing disassembly on instructions that follow the first address, when an instruction obtained through disassembly from the first address and appearing in the second address corresponds to the second block end instruction, selecting the instruction that follows the second block end instruction, said instruction that follows the second block end instruction corresponding to the first instruction of the at least one preceding block, and searching, in the memory area that follows the first instruction of the at least one preceding block, for a further block end instruction, said further block end instruction corresponding to the last instruction of the at least one preceding block, identifying a first block of instructions of the first function of the operating system kernel and a last block of instructions of the last function of the operating system kernel from among the at least one following block and at least one preceding block, and recording a first function start address and a last function end address in association with the first and last functions of the operating system kernel, the first function start address being the address of the first instruction of the first block and the last function end address being the address of the last instruction of the last block.

* * * * *